United States Patent
Mou et al.

(10) Patent No.: US 12,186,695 B2
(45) Date of Patent: Jan. 7, 2025

(54) METHOD FOR NOTIFYING SERVICE LIFE OF FILTER

(71) Applicant: Microjet Technology Co., Ltd., Hsinchu (TW)

(72) Inventors: Hao-Jan Mou, Hsinchu (TW); Chin-Chuan Wu, Hsinchu (TW); Ching-Sung Lin, Hsinchu (TW); Yung-Lung Han, Hsinchu (TW); Chi-Feng Huang, Hsinchu (TW)

(73) Assignee: Microjet Technology Co., Ltd., Hsinchu (TW)

( * ) Notice: Subject to any disclaimer, the term of this patent is extended or adjusted under 35 U.S.C. 154(b) by 404 days.

(21) Appl. No.: 17/648,948

(22) Filed: Jan. 26, 2022

(65) Prior Publication Data
US 2022/0401868 A1    Dec. 22, 2022

(30) Foreign Application Priority Data
Jun. 22, 2021   (TW) .................................. 110122772

(51) Int. Cl.
*B01D 46/00*   (2022.01)

(52) U.S. Cl.
CPC ....... *B01D 46/0086* (2013.01); *B01D 46/009* (2013.01)

(58) Field of Classification Search
CPC ............ B01D 46/0028; B01D 46/0036; B01D 46/429; B01D 46/44; B01D 46/442; F24F 8/108; F24F 8/15; F24F 8/167; F24F 11/39; F24F 11/56
See application file for complete search history.

(56) References Cited

U.S. PATENT DOCUMENTS

| | | | |
|---|---|---|---|
| 6,040,777 A | 3/2000 | Ammann et al. | |
| 10,753,301 B2 | 8/2020 | Prabhala et al. | |
| 2004/0202860 A1* | 10/2004 | Foss ..................... | B01D 46/521 428/375 |
| 2009/0298192 A1 | 12/2009 | Parham et al. | |
| 2011/0086118 A1* | 4/2011 | Kim ....................... | B01D 53/34 424/769 |

(Continued)

FOREIGN PATENT DOCUMENTS

| | | |
|---|---|---|
| DE | 40 02 843 C1 | 4/1991 |
| DE | 195 43 056 A1 | 5/1997 |

(Continued)

OTHER PUBLICATIONS

Extended European Search Report for corresponding European Application No. 22153664.2, dated Jul. 5, 2022.

*Primary Examiner* — Christopher P Jones
*Assistant Examiner* — Phillip Y Shao
(74) *Attorney, Agent, or Firm* — Birch, Stewart, Kolasch & Birch, LLP

(57) ABSTRACT

A method for notifying a service life of a filter includes steps of providing a filter for filtering an air pollution source; providing a gas detection device for detecting the air pollution source and outputting the detection data of the air pollution source; providing a connection device for receiving, computing and comparing the detection data of the air pollution source detected by the gas detection device, so as to display a reducing rate of filtering efficiency for the filter; and when the reducing rate of filtering efficiency for the filter reaches a preset alert value, the connection device sends out a notification alert of replacing the filter.

18 Claims, 20 Drawing Sheets

(56) References Cited

U.S. PATENT DOCUMENTS

| | | | |
|---|---|---|---|
| 2012/0085349 A1 | 4/2012 | Tobias et al. | |
| 2013/0129565 A1* | 5/2013 | Siaw | A61L 9/205 |
| | | | 422/4 |
| 2016/0069801 A1 | 3/2016 | Stevens et al. | |
| 2017/0098230 A1* | 4/2017 | Orangkhadivi | G06Q 10/083 |
| 2018/0021710 A1* | 1/2018 | Nonni | B01D 39/18 |
| | | | 95/273 |
| 2018/0200654 A1* | 7/2018 | Mastrup | B65D 77/12 |
| 2019/0134550 A1 | 5/2019 | Prabhakar | |
| 2021/0033586 A1 | 2/2021 | Chadha et al. | |

FOREIGN PATENT DOCUMENTS

| | | |
|---|---|---|
| EP | 2 285 451 A2 | 2/2011 |
| EP | 2 365 858 A1 | 9/2011 |
| EP | 2 617 499 A1 | 7/2013 |
| EP | 2 790 812 A1 | 10/2014 |
| JP | 2000-104946 A | 4/2000 |
| JP | 2000-274651 A | 10/2000 |
| JP | 2008-82661 A | 4/2008 |
| JP | 2011-191017 A | 9/2011 |
| JP | 2013-210162 A | 10/2013 |
| JP | 2016-217653 A | 12/2016 |
| JP | 2019-113253 A | 7/2019 |
| TW | 202001216 A | 1/2020 |
| TW | 202001223 A | 1/2020 |
| TW | I720820 B | 3/2021 |
| TW | I723771 B | 4/2021 |
| TW | I724386 B | 4/2021 |
| WO | WO 2009/051896 A2 | 4/2009 |
| WO | WO 2012/018766 A2 | 2/2012 |
| WO | WO 2012/066453 A1 | 5/2012 |

* cited by examiner

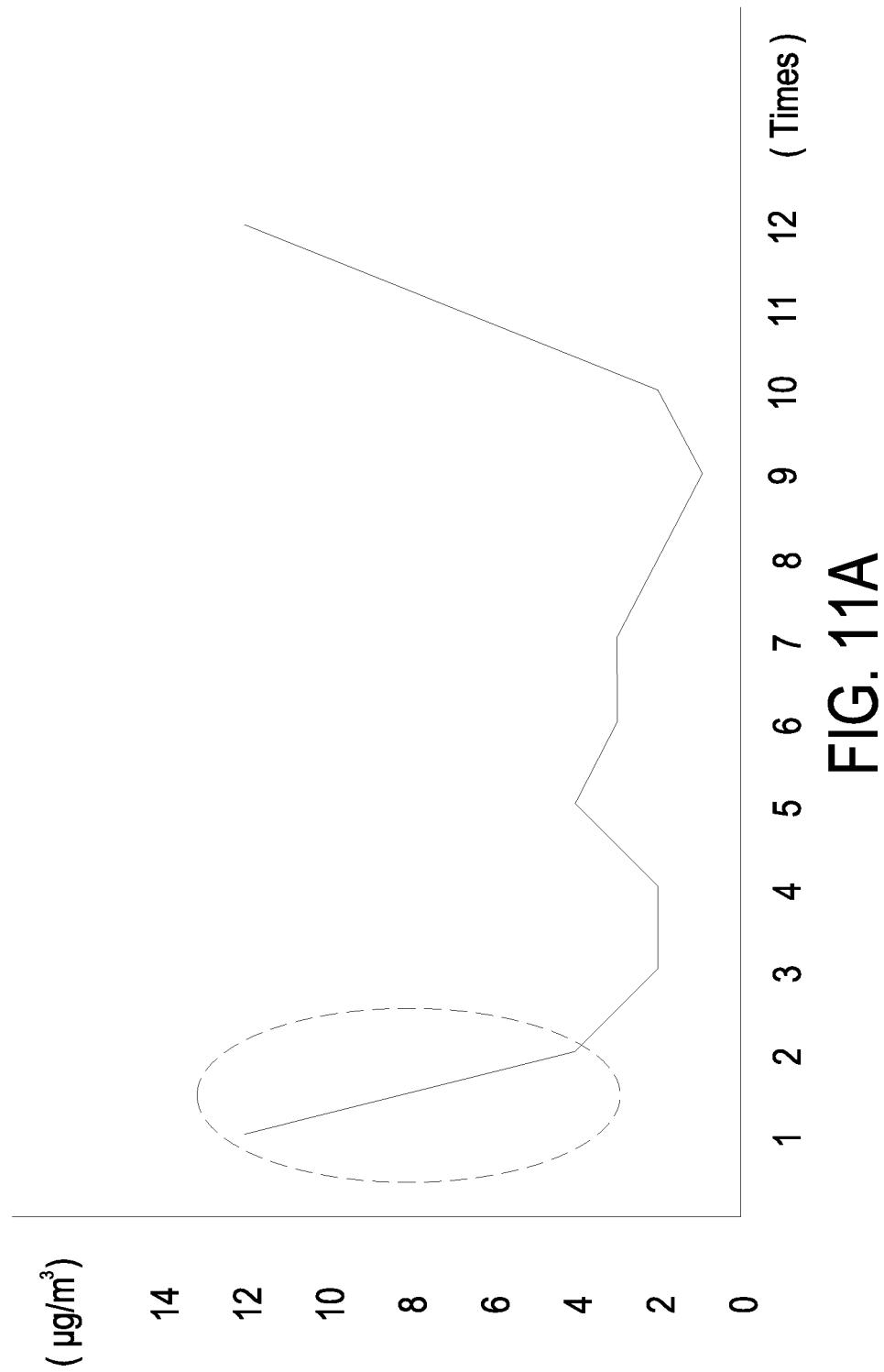

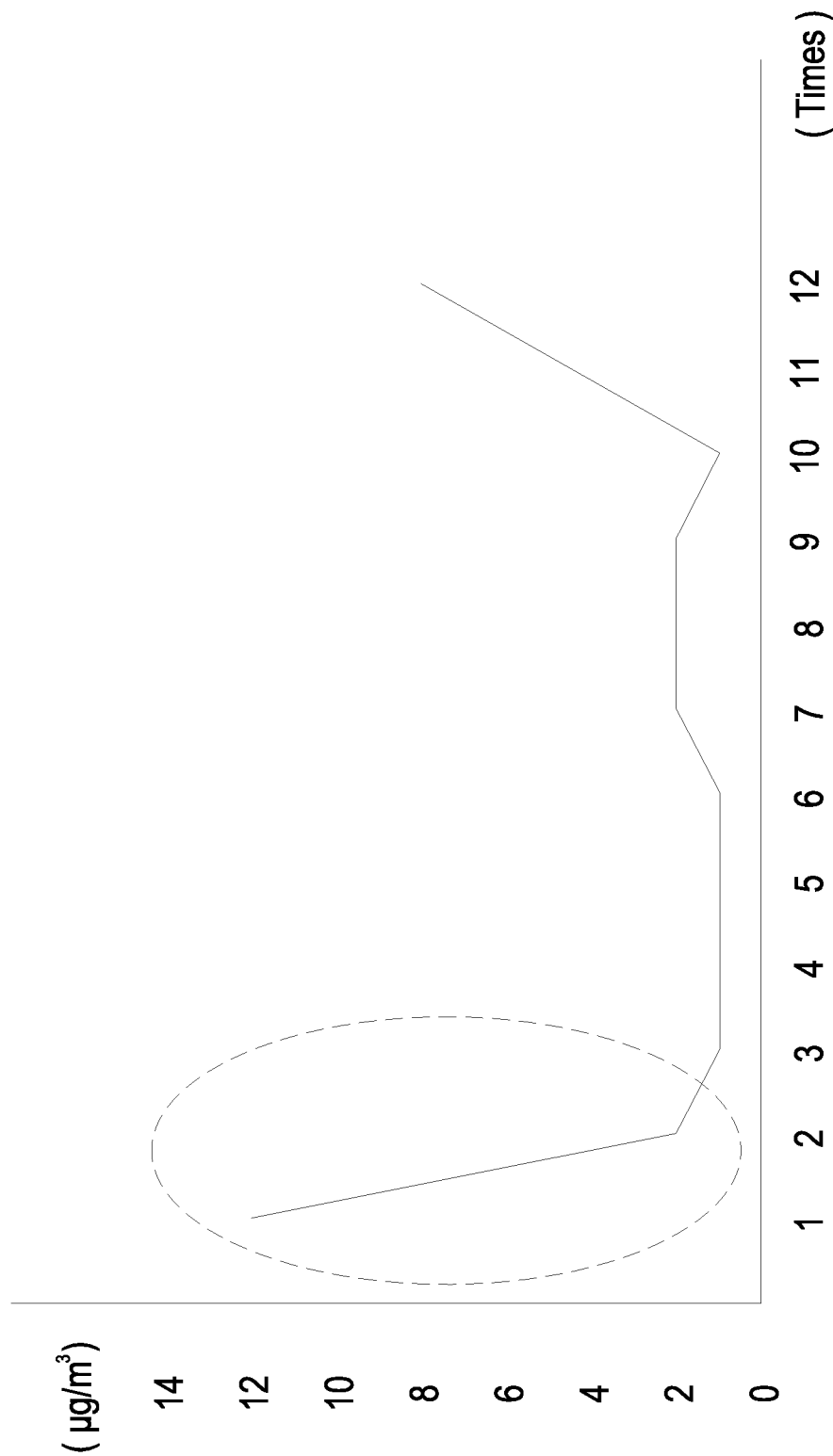

METHOD FOR NOTIFYING SERVICE LIFE OF FILTER

FIELD OF THE INVENTION

The present disclosure relates to a notification for replacing a filter, and more particularly to a method for notifying a service life of the filter.

BACKGROUND OF THE INVENTION

In recent years, people pay more and more attention to the air quality around our daily lives, and air pollution source in the air exposed in the environment might affect the human health, and even endanger the life seriously.

Therefore, in order to maintain indoor air quality and acquire good air quality, people take advantage of air conditioners or air cleaners to improve the air quality. However, these devices all employ a filter for filtering the air pollution source to block most harmful pollutants, and the filtration effect and the filtration efficiency of the filter will decrease progressively owing to the accumulation of the blocked pollutants. Therefore, a regular replacement of the filter is necessary for maintaining the filtration efficiency for the air pollutants.

Therefore, an object of the present disclosure is to provide a solution for notifying of replacing a filter in use.

SUMMARY OF THE INVENTION

In view of the need for notifying the replacement of a filter, the present disclosure provides a method for notifying a service life of the filter. The object of this invention is to provide at least one gas detection device disposed in at least one gas path where the air pollution source has been filtered by the filter, for detecting and outputting the detection data of the air pollution source, and provide at least one connection device for receiving, computing and comparing the detection data of the air pollution source detected by the gas detection device, so as to display at least one reducing rate of filtering efficiency after the filter has been used for filtering the air pollution source, thereby the connection device is able to send out a notification alert for replacing the filter accordingly.

To achieve the object mentioned above, the present disclosure provides a method for notifying a service life of a filter includes the following steps of providing at least one filter for filtering an air pollution source; providing at least one gas detection device disposed in at least one gas path where the air pollution source is filtered by the filter for detecting and outputting the detection data of the air pollution source; providing at least one connection device for receiving, computing and comparing the detection data of the air pollution source detected by the gas detection device, so as to display at least one reducing rate of the filter after filtering the air pollution source; and sending out a notification alert for replacing the at least one filter by the at least one connection device as the at least one connection device determines that the reducing rate of filtering efficiency after the filter has been used for filtering the air pollution source reaches a preset alert value.

BRIEF DESCRIPTION OF THE DRAWINGS

The above contents of the present disclosure will become more readily apparent to those ordinarily skilled in the art after reviewing the following detailed description and accompanying drawings, in which:

FIG. 11A is a graph illustrating a reducing rate of filtering efficiency for an old filter after filtering PM2.5 suspended particles according to an embodiment of the present disclosure; and FIG. 11B is a graph illustrating a reducing rate of filtering efficiency for a new filter after filtering according to an embodiment of the present disclosure.

DETAILED DESCRIPTION OF THE PREFERRED EMBODIMENT

Figure 1:
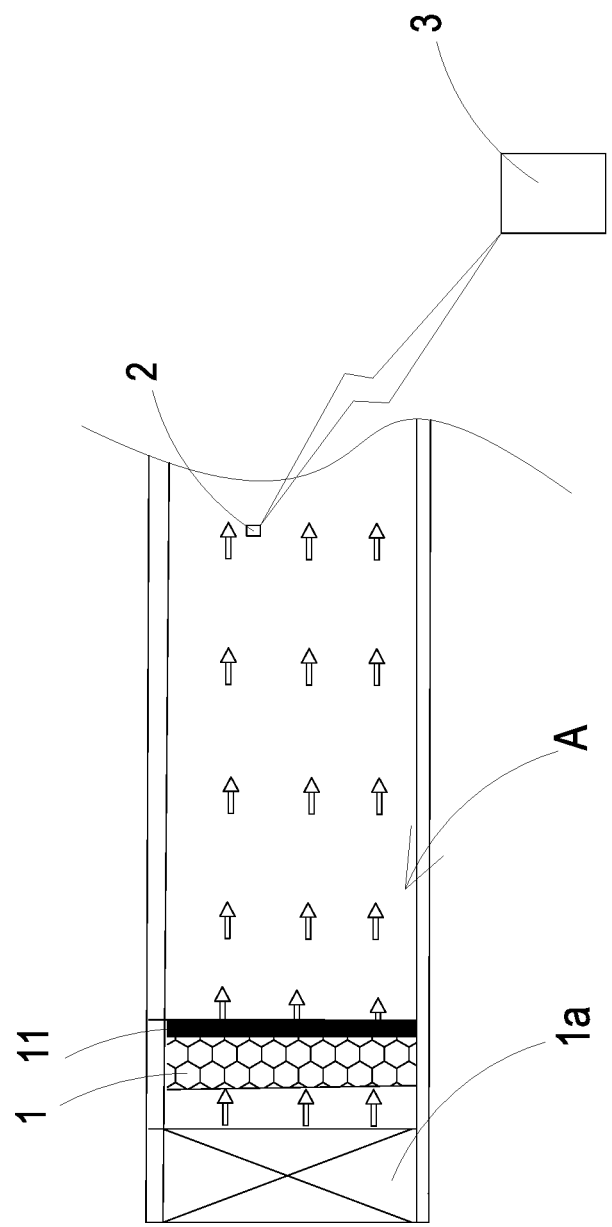
FIG. 1 is a schematic view illustrating the filter used indoors according to an embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

A method for notifying a service life of a filter in accordance with the present disclosure includes steps of providing at least one filter for filtering an air pollution source; providing at least one gas detection device disposed in a gas path where the air pollution source has been filtered by the filter for detecting and outputting detection data of the air pollution source; providing at least one connection device for receiving, computing and comparing the detection data of the air pollution source detected by the gas detection device, so as to display at least one reducing rate of filtering efficiency for the filter after filtering the air pollution source; and providing a notification alert for replacing the at least one filter when the at least one connection device determines that the reducing rate of filtering efficiency for the filter after filtering the air pollution source reaches a preset alert value.

The air pollution source refers to gaseous pollutants, particulate pollutants, derivative pollutants, toxic pollutants, malodorous pollutants, microorganisms and/or a combination thereof. In some embodiments, the gaseous pollutants include at least one selected from the group consisting of sulfur oxide, carbon monoxide, nitrogen oxide, hydrocarbon, chlorine, hydrogen chloride, carbon disulfide, hydrogen cyanide, fluorinated gases, halogenated hydrocarbon, perhalogenated alkane and a combination thereof. In some embodiments, the particulate pollutants include total suspended particulates referring to particulates suspended in the air; suspended particulate matter referring to particles having diameters less than 10 µm; dustfall referring to substances having diameters larger than 10 µm and gradually falling due to the gravity; metal fume and complex thereof referring to particulates containing metal and complex thereof; smoke referring to black or dark grey smokes composed of carbon particles; acid mist referring to microdroplets containing sulfuric acid, nitric acid, hydrochloric acid and phosphoric acid; and/or soot referring to blue and white smog containing hydrocarbons. In some embodiments, the particulate pollutants include photochemical smog referring to particulates produced by photochemical reactions and suspended in the air to cause the obstruction of visibility; and/or photochemical peroxide compounds referring to substances with strong oxidizing properties produced by the photochemical reactions. In some embodiments, the toxic pollutants include at least one selected from the group consisting of fluoride, chlorine, ammonia, hydrogen sulfide, formaldehyde, metal-containing gas, sulfuric acid, nitric acid, phosphoric acid, hydrochloric acid, vinyl chloride monomer, polychlorinated biphenyl, hydrogen cyanide, dioxin, carcinogenic polycyclic aromatic hydrocarbon, carcinogenic volatile organic compound, asbestos, substance containing asbestos and a combination thereof. In some embodiments, the malodorous pollutants include at least one selected from the group consisting methyl monosulfide, monothiol, monomethylamine and a combination thereof. In some embodiments, the microorganisms include at least one selected from the group consisting of bacteria, viruses and a combination thereof.

The filter mentioned above includes at least one selected from the group consisting of a glass fiber, an artificial fiber, a carbon fiber, a vegetable fiber, a wool fiber, an asbestos fiber, a nanofiber, an activated carbon, a nonwoven fabric and a combination thereof. Please refer to FIG. 1. In the embodiment, the filter 1 is further coated with an additive 11 for effectively enhancing a filtration efficiency of the filter 1. Preferably but not limited, the additive 11 is a layer of cleansing factor containing chlorine dioxide for inhibiting viruses and bacteria contained in the air pollution source. Preferably but not limited, the additive 11 is an herbal protective layer extracted from ginkgo and Japanese *Rhus chinensis* to form an herbal protective anti-allergic filter, so as to resist allergy effectively and destroy a surface protein of influenza virus passing through the filter. Preferably but not limited, the additive 11 is a silver ion for inhibiting viruses and bacteria contained in the air pollution source. Preferably but not limited, the additive 11 is a zeolite for effectively adsorbing volatile organic compounds in the air pollution source. Preferably but not limited, the additive 11 is a titanium dioxide for effectively forming a photocatalysis to remove the air pollution source.

The at least one gas detection device mentioned above is disposed in at least one gas path where the air pollution source has been filtered by the filter for detecting the air pollution source and outputting the detection data of the air pollution source. Please refer to FIG. 1. The filter 1 is disposed in a gas path A of a filtration device and the air is guided by a gas guider 1a into the gas path A, so as to force the air to pass through the filter 1 and achieve a filtration of the air pollution source. Although the number of the gas path A of the filtration device as shown in FIG. 1 is one, it also can be implemented to be two or more without limitation. As such, a plurality of filters 1 can be arranged respectively in each gas path A, and at least one gas detection device 2 can be provided in at least one of the gas paths A where the air pollution source has been filtered by the filter 1 for detecting the air pollution source and outputting the detection data of the air pollution source.

Please refer to FIG. 1. The connection device 3 mentioned above receives the detection data of the air pollution source detected by the gas detection device 2, and computes and compares the detection data to display a reducing rate of filtering efficiency for the filter after filtering the air pollution source. When the reducing rate of filtering efficiency for the filter after filtering the air pollution source is determined to be reaching a preset alert value by the connection device 3, the connection device 3 sends out a notification alert for replacing the filter 1. In some embodiments, the connection device 3 receives the detection data of the air pollution source detected by the gas detection device 2 via a wireless transmission, and the wireless transmission is performed by at least one selected from the group consisting of a Wi-Fi module, a Bluetooth module, a radio frequency identification module, and a near field communication module. Furthermore, in some embodiments, the connection device 3 is selected from the group consisting of a mobile device and a display device.

For understanding the method for notifying the service life of the filter according to the present disclosure, the detailed structure of the gas detection device 2 and how the gas detection device 2 detects the air pollution source and outputs the detection data of the air pollution source are described below.

Figure 2:
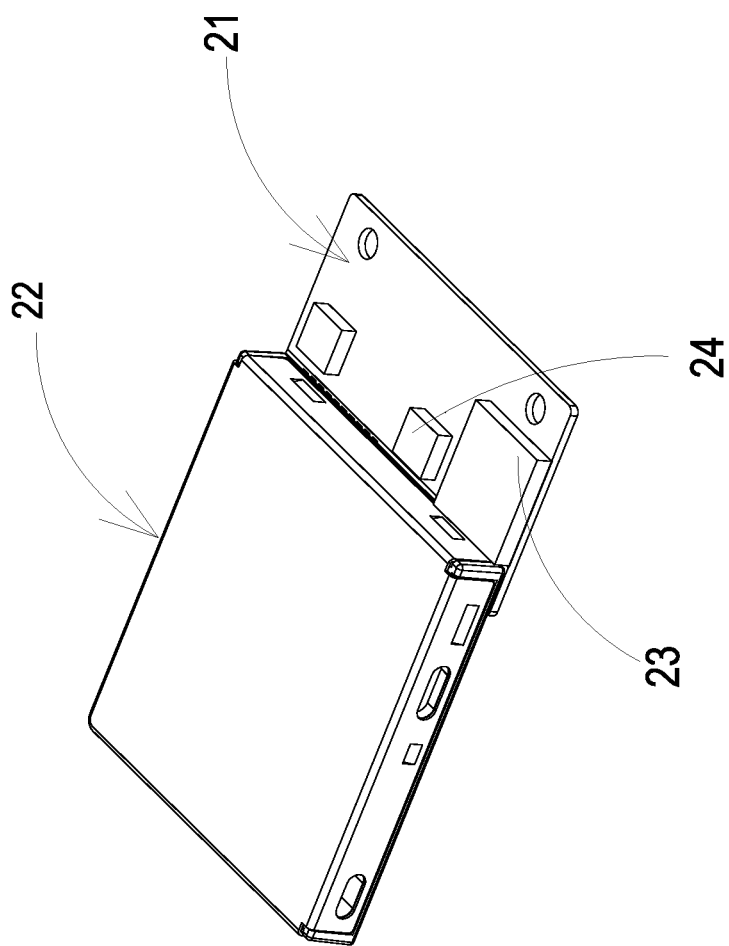
FIG. 2 is a schematic view illustrating an assembled gas detection device used indoors according to an embodiment of the present disclosure.
Figure 3A:
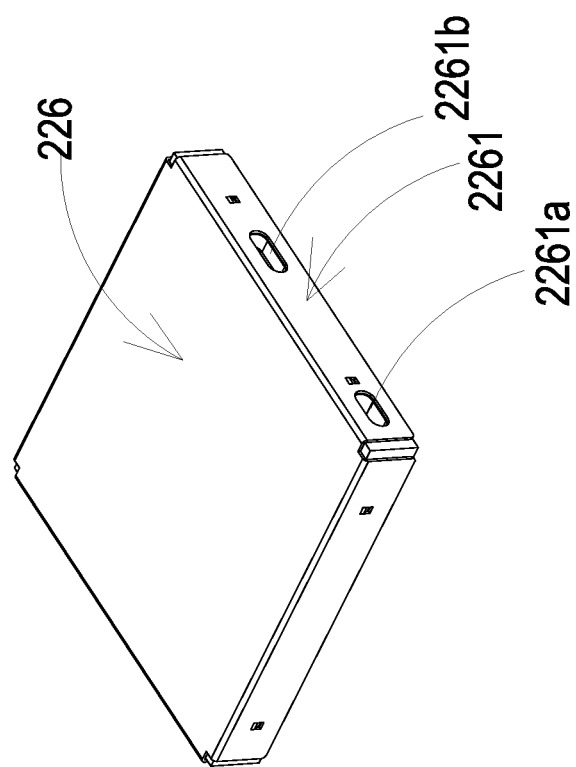
FIG. 3A is a schematic view illustrating an assembled gas detection main body according to an embodiment of the present disclosure.
Figure 3B:
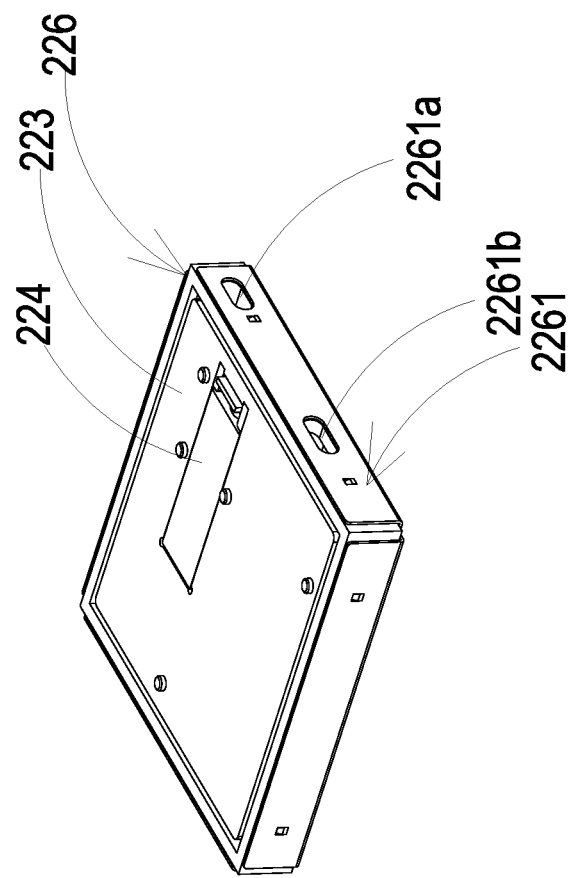
FIG. 3B is a schematic view illustrating the assembled gas detection main body according to the embodiment of the present disclosure from another viewing angle.

Please refer to FIG. 2 to FIG. 10C. The gas detection device 2 includes a control circuit board 21, a gas detection main body 22, a microprocessor 23 and a communicator 24. As shown in FIG. 2, the gas detection main body 22, the microprocessor 23 and the communicator 24 are integrally packaged on the control circuit board 21 and electrically connected therewith, and the microprocessor 23 controls a detection operation of the gas detection main body 22. The gas detection main body 22 detects the air pollution source and outputs a detection signal, and the microprocessor 23 receives, computes and processes the detection signal to generate the detection data of the air pollution source and provides the detection data to the communicator 24 for external wireless transmission. The wireless transmission is performed by at least one selected from the group consisting of a Wi-Fi module, a Bluetooth module, a radio frequency identification module, and a near field communication module. Furthermore, the connection device 3 is selected from the group consisting of a mobile device and a display device.

Figure 10A:
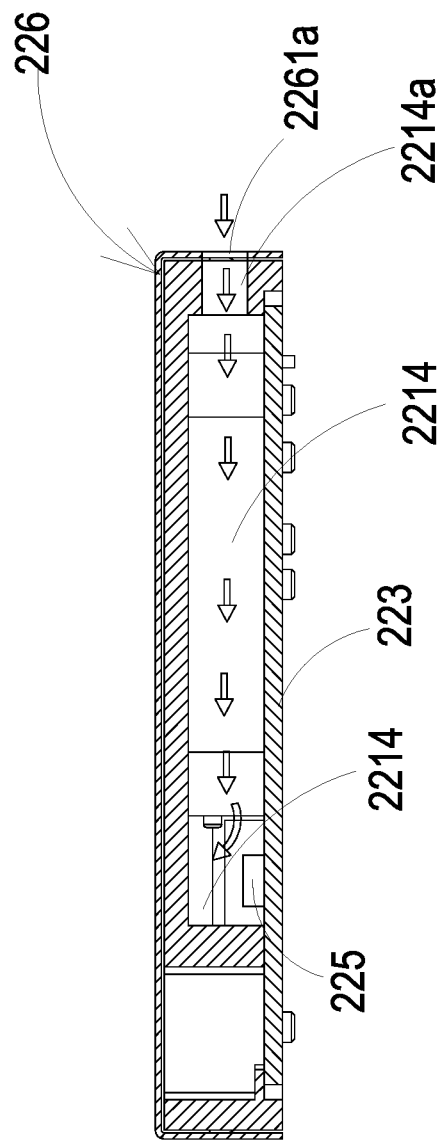
FIG. 10A is a schematic cross-sectional view illustrating an inlet path of the air into the gas detection main body through an inlet opening of an outer cover according to an embodiment of the present disclosure.

As shown in FIG. 2, FIG. 3A, FIG. 3B, FIG. 4, FIG. 5A and FIG. 5B, the gas detection main body 22 includes a base 221, a piezoelectric actuator 222, a driving circuit board 223, a laser component 224, a particulate sensor 225, an outer cover 226 and a gas sensor 227. The base 221 includes a first surface 2211, a second surface 2212, a laser loading region 2213, a gas-inlet groove 2214, a gas-guiding-component loading region 2215 and a gas-outlet groove 2216. In the embodiment, the first surface 2211 and the second surface 2212 are two surfaces opposite to each other. In the embodiment, the laser loading region 2213 is hollowed out from the first surface 2211 to the second surface 2212. The outer cover 226 covers the base 221 and includes a lateral plate 2261. The lateral plate 2261 includes an inlet opening 2261a and an outlet opening 2261b. The gas-inlet groove 2214 is concavely formed from the second surface 2212 and disposed adjacent to the laser loading region 2213. The gas-inlet groove 2214 includes a gas-inlet 2214a and two lateral walls. The gas-inlet 2214a is in communication with an environment outside the base 221, and is spatially corresponding in position to the inlet opening 2261a of the outer cover 226. Two transparent windows 2214b are opened on the two lateral walls, respectively, and are in communication with the laser loading region 2213. Therefore, as the first surface 2211 of the base 221 is covered and attached by the outer cover 226, and the second surface 2212 of the base 221 is covered and attached by the driving circuit board 223, and thus an inlet path is collaboratively defined by the gas-inlet groove 2214, the outer cover 226, and the driving circuit board 223 (as shown in FIG. 10A).

Figure 10B:
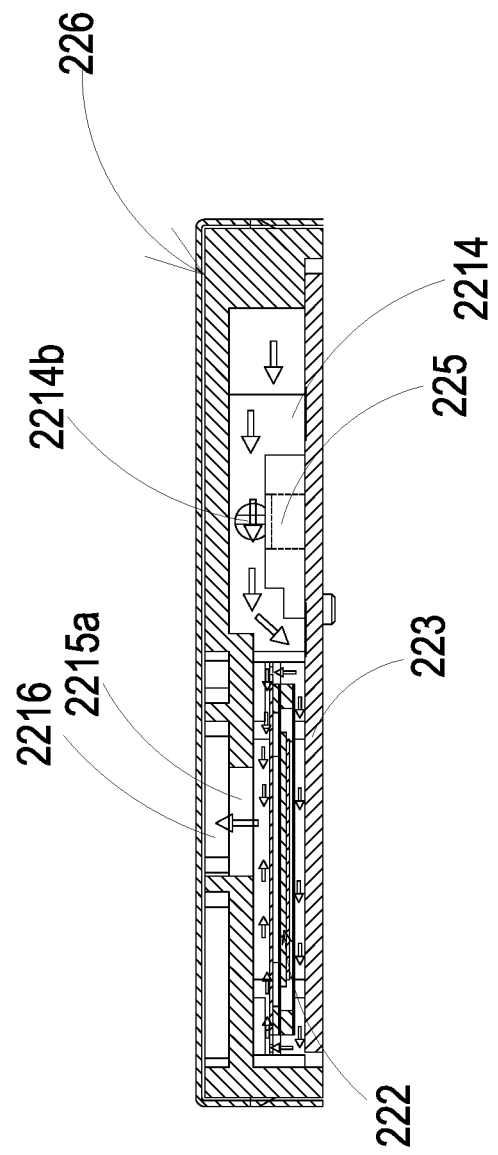
FIG. 10B is a schematic cross-sectional view illustrating the air passing through a light beam path emitted by the laser component of the gas detection main body for detecting suspended particles and the piezoelectric actuator guiding the air according to the embodiment of the present disclosure.
Figure 10C:
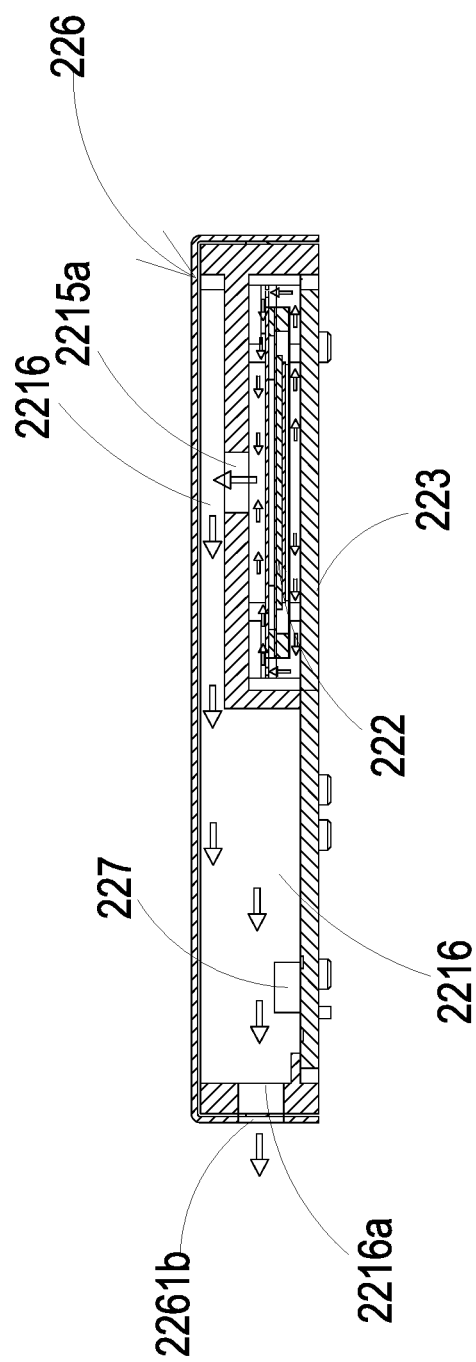
FIG. 10C is a schematic cross-sectional view illustrating an outlet path of the air discharged outside of the gas detection main body from a gas-outlet groove through a gas-outlet and an outlet opening according to the embodiment of the present disclosure.

In the embodiment, the gas-guiding-component loading region 2215 mentioned above is concavely formed from the second surface 2212 and in communication with the gas-inlet groove 2214. A ventilation hole 2215a penetrates a bottom surface of the gas-guiding-component loading region 2215 and a plurality of positioning protrusions 2215b are disposed at the corners of the gas-guiding-component loading region 2215. In the embodiment, the gas-outlet groove 2216 includes a gas-outlet 2216a, and the gas-outlet 2216a is spatially corresponding to the outlet opening 2261b of the outer cover 226. The gas-outlet groove 2216 includes a first section 2216b and a second section 2216c. The first section 2216b is concavely formed from a region of the first surface 2211 spatially corresponding to a vertical projection area of the gas-guiding-component loading region 2215. The second section 2216c is hollowed out from the first surface 2211 to the second surface 2212 in a region where the first surface 2211 is misaligned with the vertical projection area of the gas-guiding-component loading region 2215 and extended therefrom. The first section 2216b and the second section 2216c are connected to form a stepped structure. Moreover, the first section 2216b of the gas-outlet groove 2216 is in communication with the ventilation hole 2215a of the gas-guiding-component loading region 2215, and the second section 2216c of the gas-outlet groove 2216 is in communication with the gas-outlet 2216a. In that, when the first surface 2211 of the base 221 is attached and covered by the outer cover 226 and the second surface 2212 of the base 221 is attached and covered by the driving circuit board 223, the gas-outlet groove 2216, the outer cover 226 and the driving circuit board 223 collaboratively define an outlet path (as shown in FIG. 10C).

Figure 4:
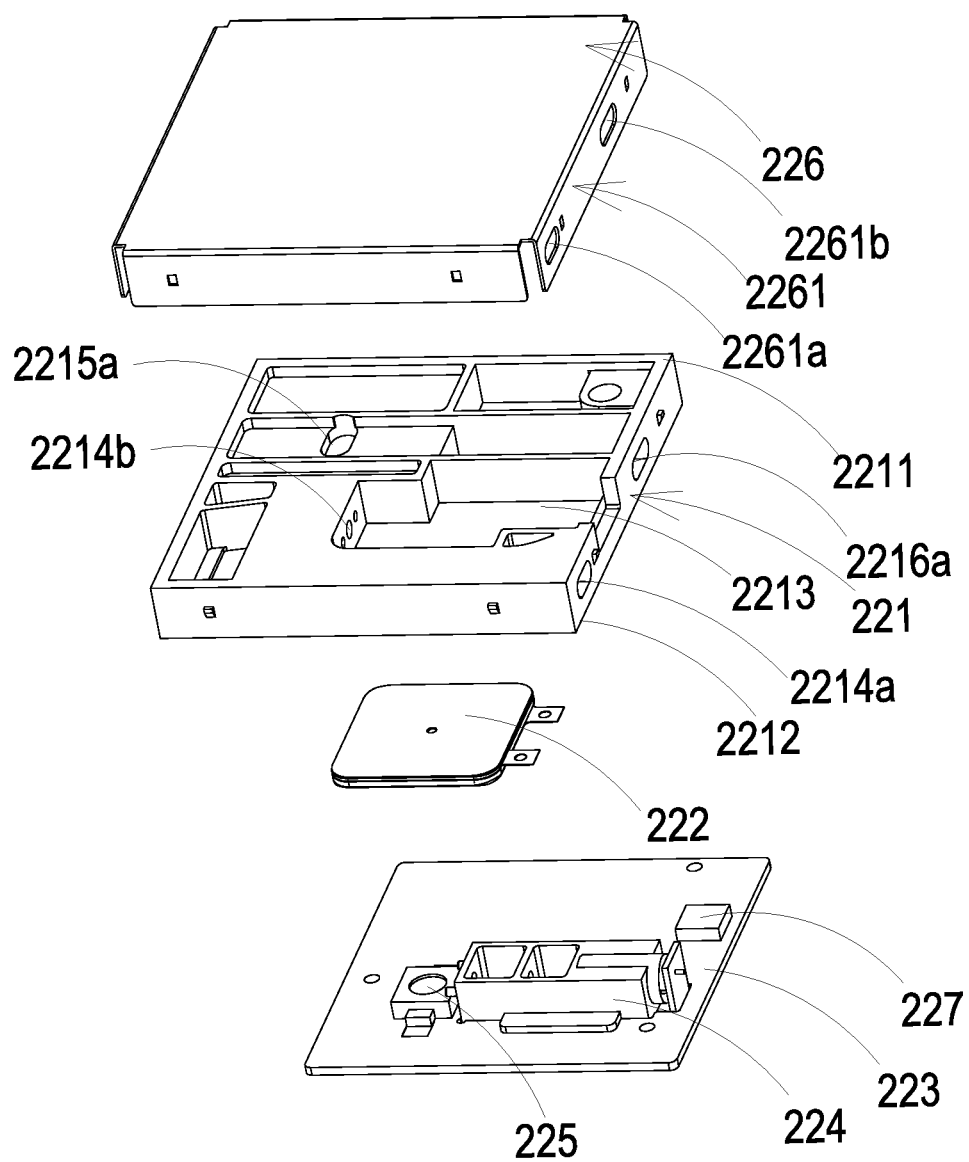
FIG. 4 is a schematic exploded view illustrating the gas detection main body according to the embodiment of the present disclosure.
Figure 5A:
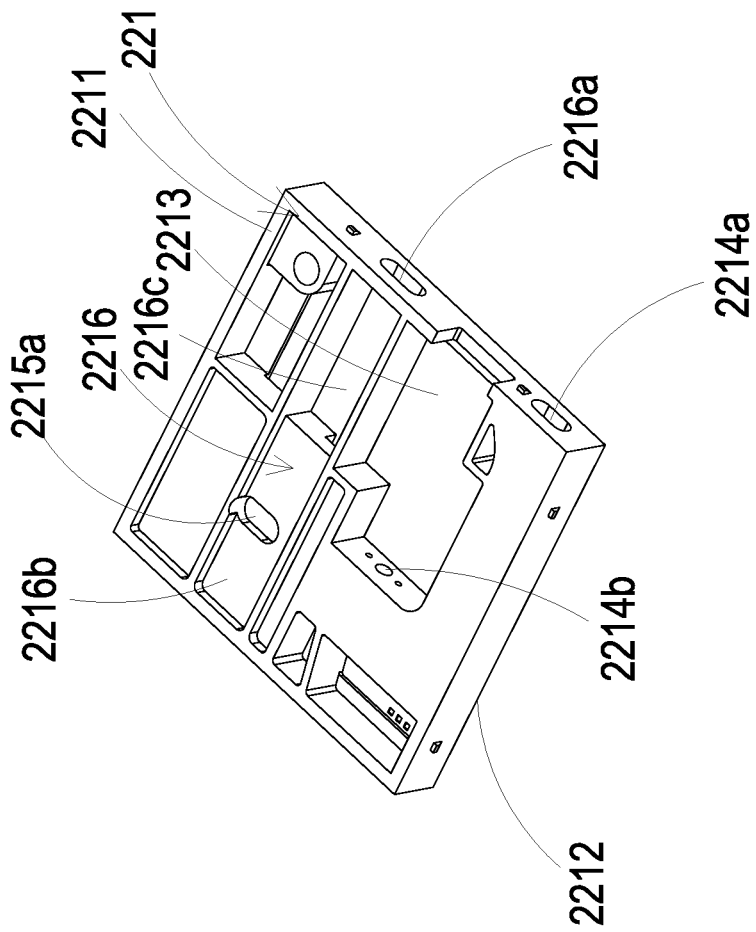
FIG. 5A is a schematic view illustrating a base according to an embodiment of the present disclosure.
Figure 5B:
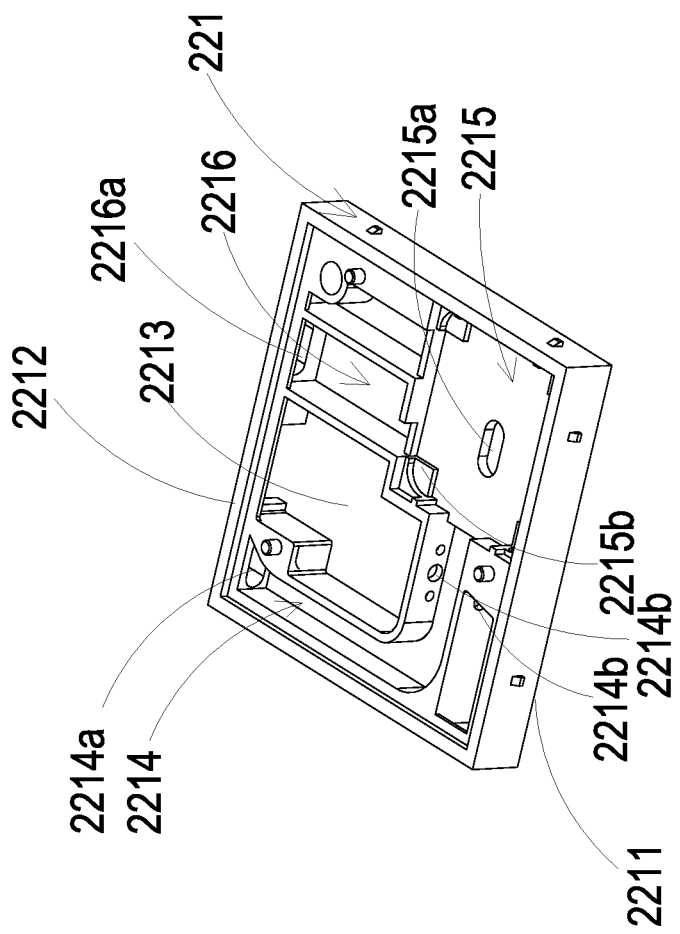
FIG. 5B is a schematic view illustrating the base according to the embodiment of the present disclosure from another viewing angle.
Figure 6:
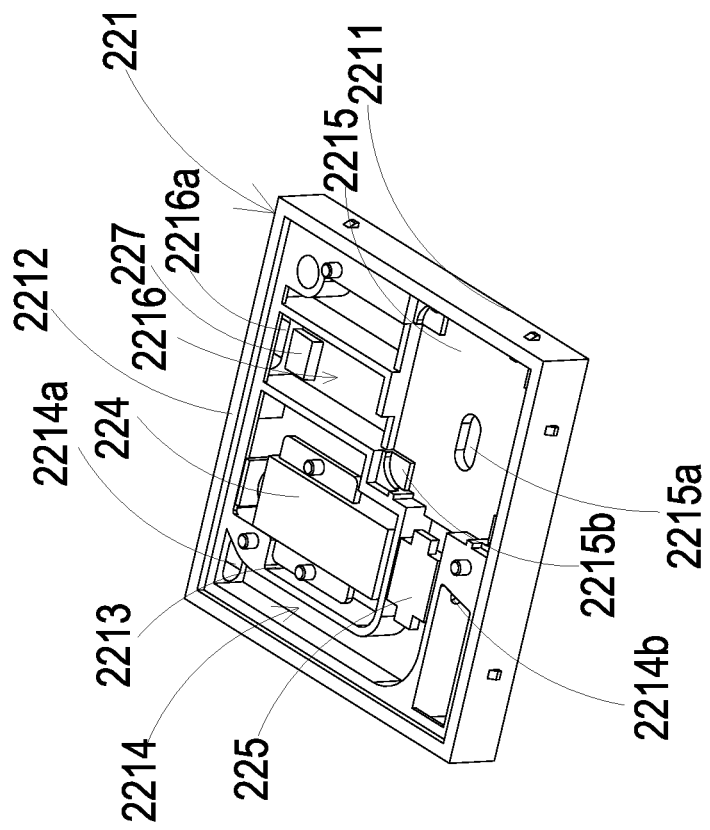
FIG. 6 is a schematic view illustrating a laser component received within the base according to an embodiment of the present disclosure.

As shown in FIG. 4 and FIG. 6, the laser component 224 and the particulate sensor 225 mentioned above are disposed on the driving circuit board 223 and located within the base 221. In order to clearly describe and illustrate the positions of the laser component 224 and the particulate sensor 225 in the base 221, the driving circuit board 223 is specifically omitted in FIG. 6. The laser component 224 is accommodated in the laser loading region 2213 of the base 221, and the particulate sensor 225 is accommodated in the gas-inlet groove 2214 of the base 221 and aligned to the laser component 224. In addition, as shown in FIG. 5A, the laser component 224 (not shown) is spatially corresponding to the transparent window 2214b, thereby a light beam emitted by the laser component 224 passes through the transparent window 2214b and irradiates into the gas-inlet groove 2214. Furthermore, as shown in FIG. 10B, the light beam path extends from the laser component 224 and passes through the transparent window 2214b in an orthogonal direction perpendicular to the gas-inlet groove 2214. In the embodiment, a projecting light beam emitted from the laser component 224 passes through the transparent window 2214b and enters the gas-inlet groove 2214 to irradiate the gas in the gas-inlet groove 2214. When the suspended particles contained in the gas are irradiated and generate scattered light spots, the scattered light spots are detected and calculated by the particulate sensor 225 for obtaining the detection data of the suspended particles contained in the gas.

As shown in FIG. 4, the gas sensor 227 mentioned above is positioned and disposed on the driving circuit board 223 and electrically connected to the driving circuit board 223, and is accommodated in the gas-outlet groove 2216, as shown in FIG. 6, for detecting the air pollution source guided into the gas-outlet groove 2216. In some embodiments, the gas sensor 227 is implemented to detect the information of gaseous pollutants and/or microorganisms.

Figure 7A:
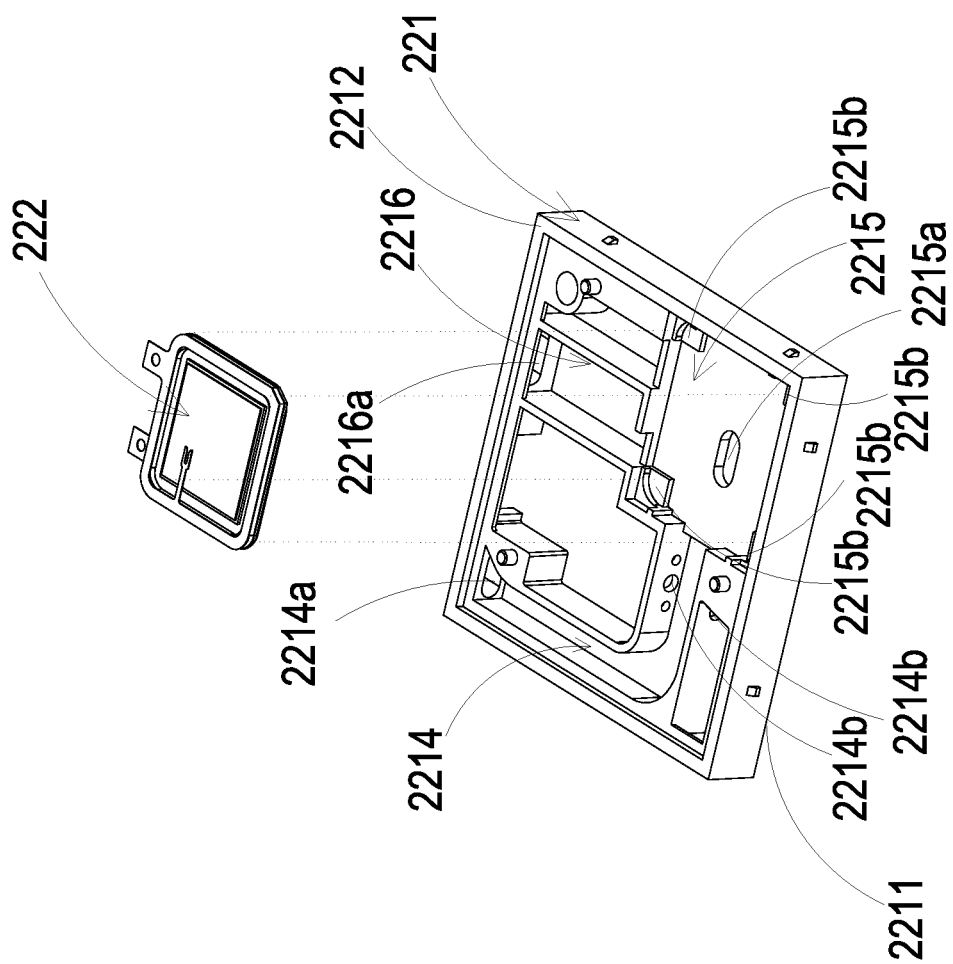
FIG. 7A is a schematic exploded view illustrating a piezoelectric actuator and the base according to an embodiment of the present disclosure.
Figure 7B:
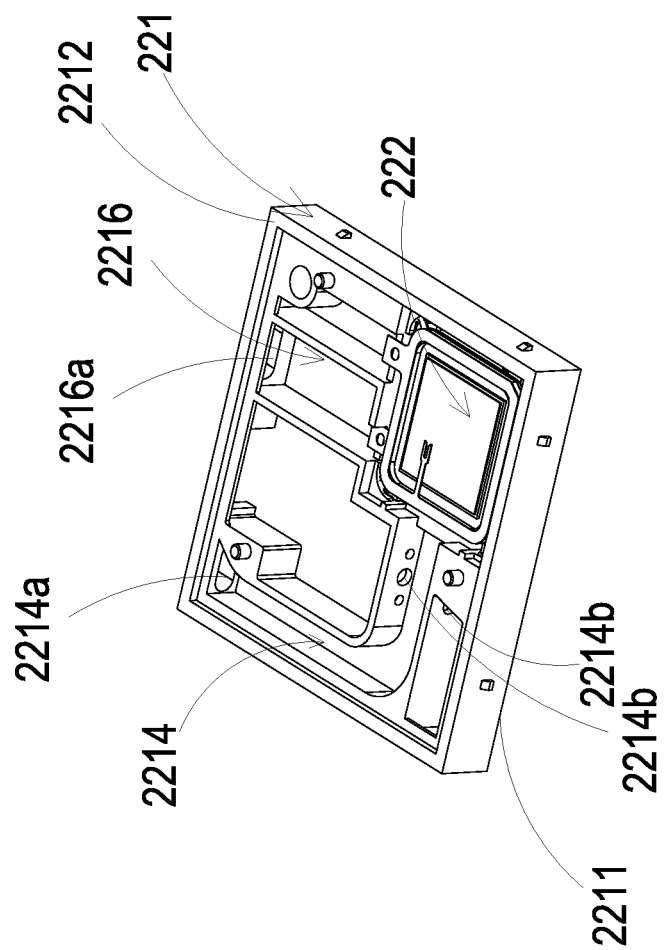
FIG. 7B is a schematic view illustrating the combination of the piezoelectric actuator and the base according to the embodiment of the present disclosure.

Furthermore, as shown in FIG. 7A and FIG. 7B, the piezoelectric actuator 222 mentioned above is accommodated in the square-shaped gas-guiding-component loading region 2215 of the base 221. In addition, the gas-guiding-component loading region 2215 is in communication with the gas-inlet groove 2214. When the piezoelectric actuator 222 is enabled, the gas in the gas-inlet groove 2214 is inhaled by the piezoelectric actuator 222, so that the gas flows into the piezoelectric actuator 222 and is transported into the gas-outlet groove 2216 through the ventilation hole 2215a of the gas-guiding-component loading region 2215. As shown in FIG. 10B and FIG. 10C, the driving circuit board 223 covers and attaches to the second surface 2212 of the base 221, and the laser component 224 is positioned and disposed on the driving circuit board 223, and is electrically connected to the driving circuit board 223 (as shown in FIG. 4). The particulate sensor 225 also is positioned and disposed on the driving circuit board 223, and is electrically connected to the driving circuit board 223. As shown in FIG. 10A and FIG. 10C, when the outer cover 226 covers the base 221, the inlet opening 2261a is spatially corresponding to the gas-inlet 2214a of the base 221, and the outlet opening 2261b is spatially corresponding to the gas-outlet 2216a of the base 221.

Figure 8A:
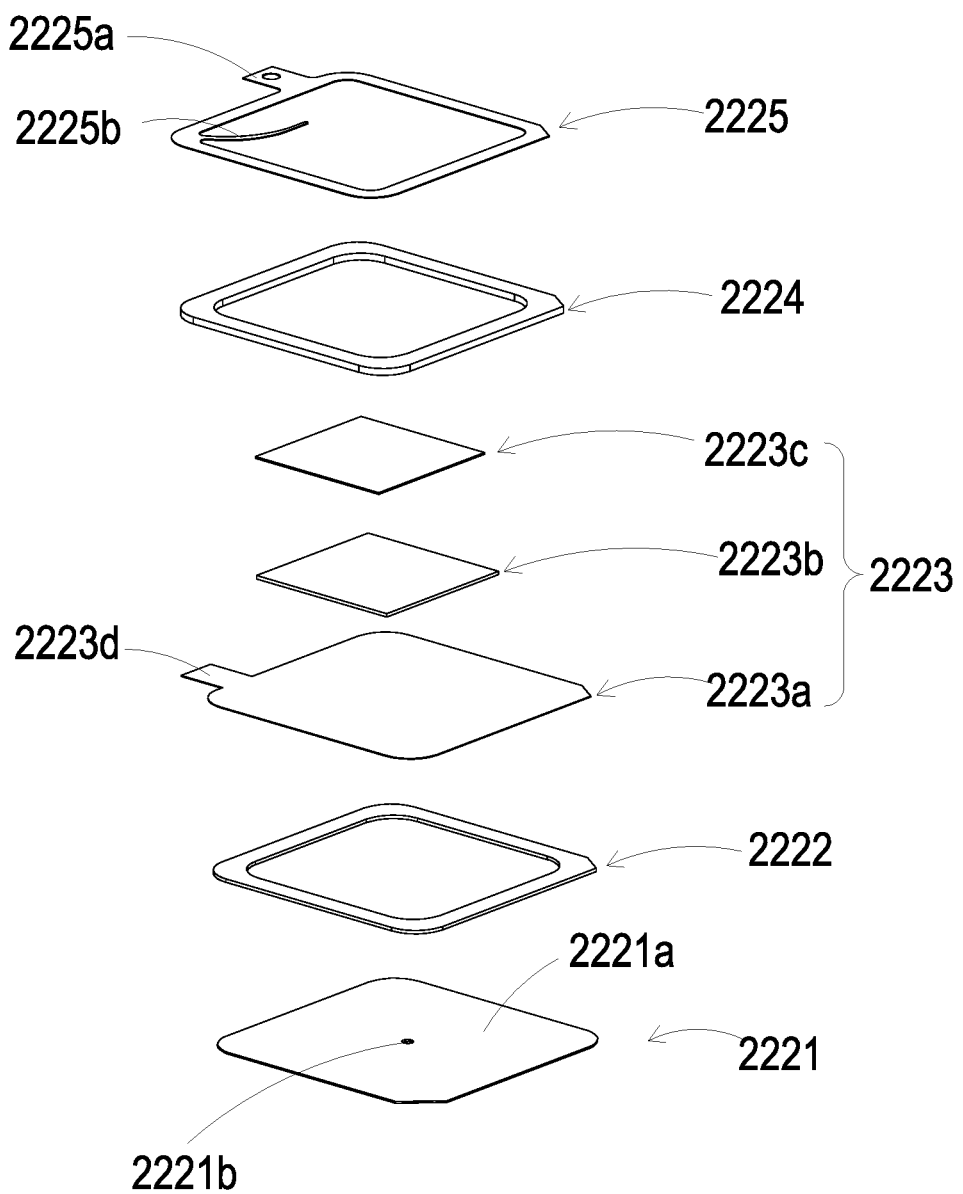
FIG. 8A is a schematic exploded view illustrating the piezoelectric actuator according to an embodiment of the present disclosure.
Figure 8B:
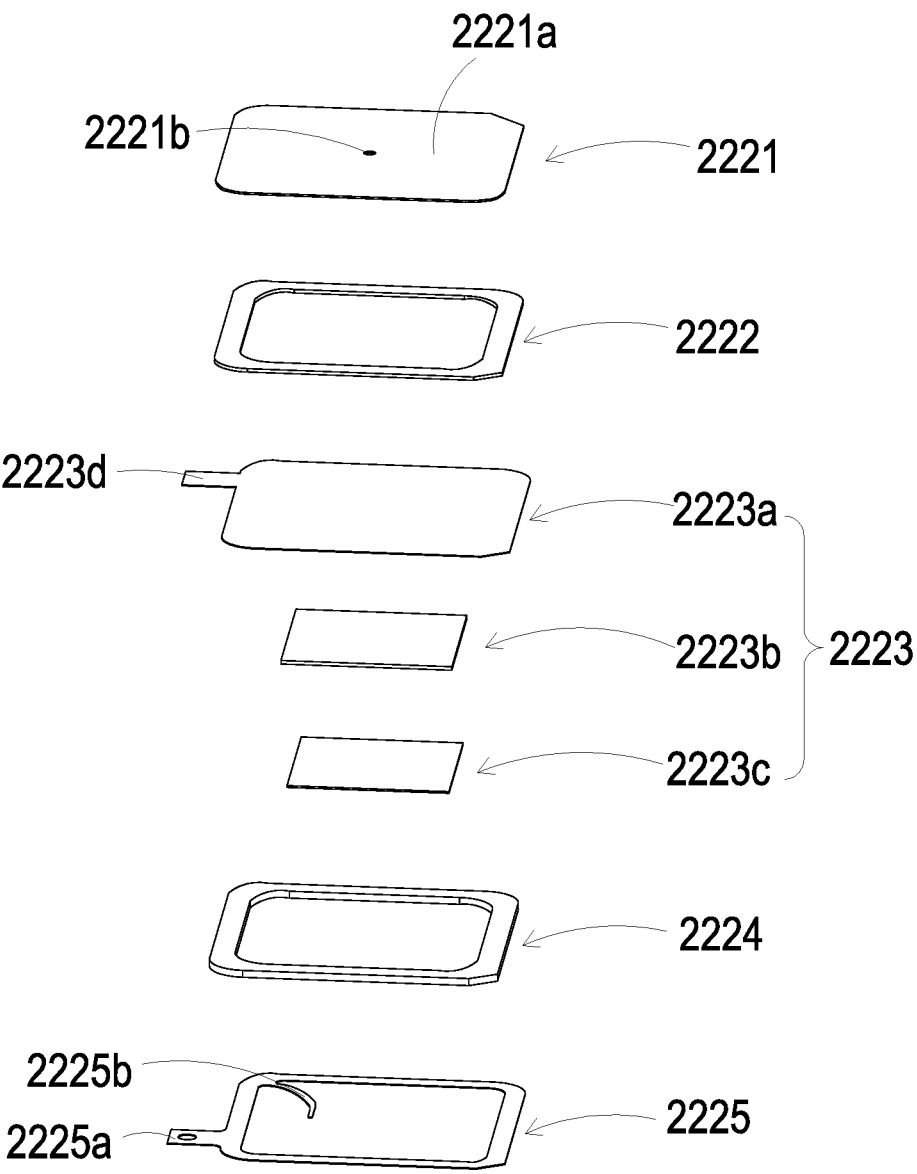
FIG. 8B is a schematic exploded view illustrating the piezoelectric actuator according to the embodiment of the present disclosure from another viewing angle.
Figure 9A:
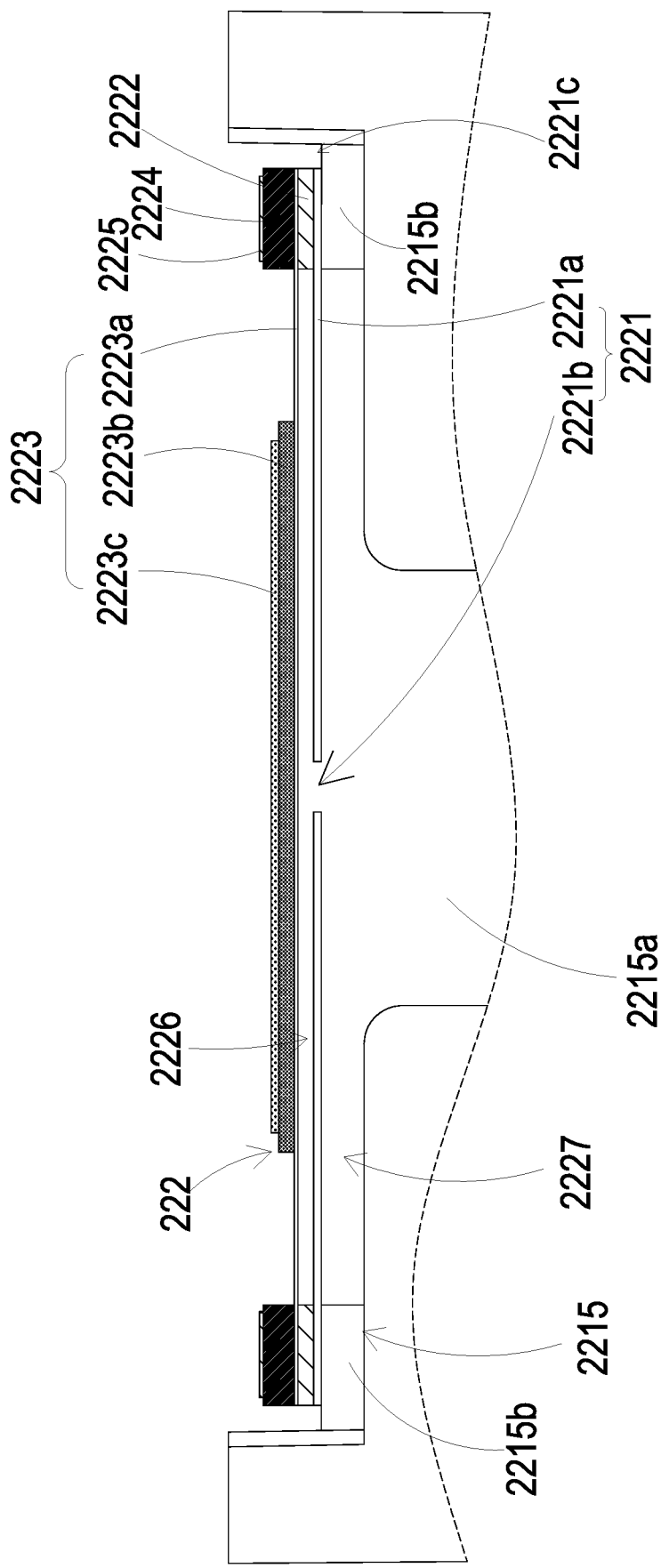
FIG. 9A is a schematic cross-sectional view illustrating the piezoelectric actuator before operation according to an embodiment of the present disclosure.

Further, as shown in FIG. 8A, FIG. 8B and FIG. 9A, the piezoelectric actuator 222 mentioned above includes a gas-injection plate 2221, a chamber frame 2222, an actuator element 2223, an insulation frame 2224 and a conductive frame 2225. In the embodiment, the gas-injection plate 2221 is made by a flexible material and includes a suspension plate 2221a and a hollow aperture 2221b. The suspension plate 2221a is a sheet structure and is permitted to undergo a bending deformation. Preferably but not exclusively, the shape and the size of the suspension plate 2221a are corresponding to the inner edge of the gas-guiding-component loading region 2215, but not limited thereto. The hollow aperture 2221b passes through a center of the suspension plate 2221a, so as to allow the gas to flow therethrough. Preferably but not exclusively, the shape of the suspension plate 2221a is selected from the group consisting of a square, a circle, an ellipse, a triangle and a polygon.

The chamber frame 2222 mentioned above is carried and stacked on the gas-injection plate 2221. In addition, the shape of the chamber frame 2222 is corresponding to the gas-injection plate 2221. The actuator element 2223 is carried and stacked on the chamber frame 2222 and collaboratively defines a resonance chamber 2226 with the gas-injection plate 2221 and the suspension plate 2221a (as shown in FIG. 9A). The insulation frame 2224 is carried and stacked on the actuator element 2223 and the appearance of the insulation frame 2224 is similar to that of the chamber frame 2222. The conductive frame 2225 is carried and stacked on the insulation frame 2224, and the appearance of the conductive frame 2225 is similar to that of the insulation frame 2224. In addition, the conductive frame 2225 includes a conducting pin 2225a extended outwardly from an outer edge of the conducting pin 2225a and a conducting electrode 2225b extended inwardly from an inner edge of the conductive frame 2225.

Moreover, the actuator element 2223 further includes a piezoelectric carrying plate 2223a, an adjusting resonance plate 2223b and a piezoelectric plate 2223c. The piezoelectric carrying plate 2223a is carried and stacked on the chamber frame 2222. The adjusting resonance plate 2223b is carried and stacked on the piezoelectric carrying plate 2223a. The piezoelectric plate 2223c is carried and stacked on the adjusting resonance plate 2223b. The adjusting resonance plate 2223b and the piezoelectric plate 2223c are accommodated in the insulation frame 2224. The conducting electrode 2225b of the conductive frame 2225 is electrically connected to the piezoelectric plate 2223c. In the embodiment, the piezoelectric carrying plate 2223a and the adjusting resonance plate 2223b are made by a conductive material. The piezoelectric carrying plate 2223a includes a piezoelectric pin 2223d. The piezoelectric pin 2223d and the conducting pin 2225a are electrically connected to a driving circuit (not shown) of the driving circuit board 223, so as to receive a driving signal (which can be a driving frequency and a driving voltage). Through this structure, a circuit is formed by the piezoelectric pin 2223d, the piezoelectric carrying plate 2223a, the adjusting resonance plate 2223b, the piezoelectric plate 2223c, the conducting electrode 2225b, the conductive frame 2225 and the conducting pin 2225a for transmitting the driving signal. Moreover, the insulation frame 2224 provides insulation between the conductive frame 2225 and the actuator element 2223, so as to avoid the occurrence of a short circuit. Thereby, the driving signal is transmitted to the piezoelectric plate 2223c. After receiving the driving signal, the piezoelectric plate 2223c deforms due to the piezoelectric effect, and the piezoelectric carrying plate 2223a and the adjusting resonance plate 2223b are further driven to bend and vibrate in the reciprocating manner.

As described above, the adjusting resonance plate 2223b is located between the piezoelectric plate 2223c and the piezoelectric carrying plate 2223a and served as a cushion between the piezoelectric plate 2223c and the piezoelectric carrying plate 2223a. Thereby, the vibration frequency of the piezoelectric carrying plate 2223a is adjustable. Basically, the thickness of the adjusting resonance plate 2223b is greater than the thickness of the piezoelectric carrying plate 2223a, and the thickness of the adjusting resonance plate 2223b is adjustable to adjust the vibration frequency of the actuator element 2223 accordingly. In the embodiment, the gas-injection plate 2221, the chamber frame 2222, the actuator element 2223, the insulation frame 2224 and the conductive frame 2225 are stacked and positioned in the gas-guiding-component loading region 2215 sequentially, so that the piezoelectric actuator 222 is supported and positioned on the positioning protrusions 2215b of the gas-guiding-component loading region 2215. A vacant space 2221c is defined by the piezoelectric actuator 222 between the suspension plate 2221a and an inner edge of the gas-guiding-component loading region 2215 for gas flowing therethrough. A flowing chamber 2227 is formed between the gas-injection plate 2221 and the bottom surface of the gas-guiding-component loading region 2215. The flowing chamber 2227 is in communication with the resonance chamber 2226 located between the actuator element 2223, the gas-injection plate 2221 and the suspension plate 2221a through the hollow aperture 2221b of the gas-injection plate 2221. By controlling the vibration frequency of the gas in the resonance chamber 2226 to be close to the vibration frequency of the suspension plate 2221a, the Helmholtz resonance effect is generated between the resonance chamber 2226 and the suspension plate 2221a, so as to improve the efficiency of gas transportation.

Figure 9B:
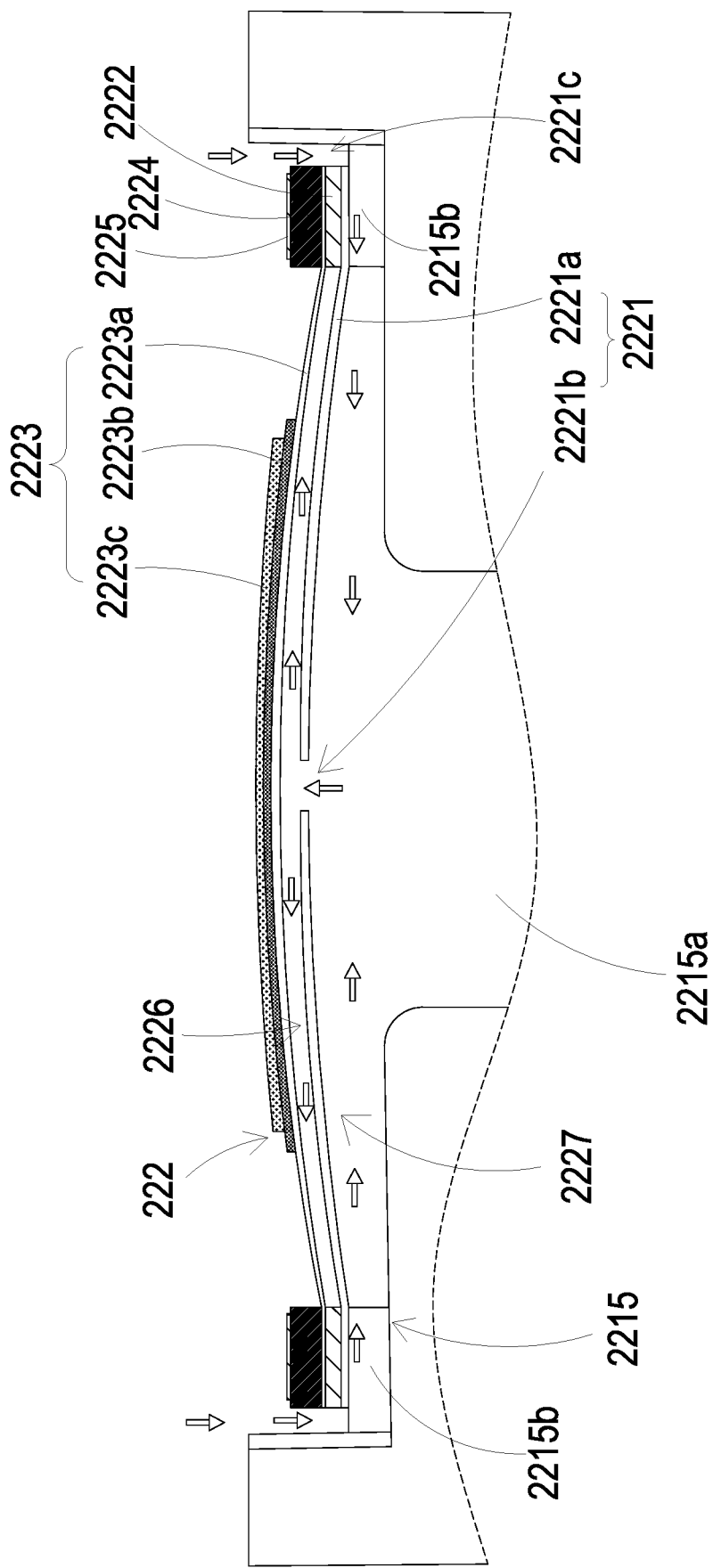
FIG. 9B is a schematic cross-sectional view illustrating a first operation step of the piezoelectric actuator according to the embodiment of the present disclosure.

As shown in FIG. 9B, when the piezoelectric plate 2223c moves away from the bottom surface of the gas-guiding-component loading region 2215, the suspension plate 2221a of the gas-injection plate 2221 is driven to move away from the bottom surface of the gas-guiding-component loading region 2215 by the piezoelectric plate 2223c. In that, the volume of the flowing chamber 2227 is expanded rapidly, the internal pressure of the flowing chamber 2227 is decreased and generates a negative pressure, and the gas outside the piezoelectric actuator 222 is inhaled through the vacant space 2221c and enters the resonance chamber 2226 through the hollow aperture 2221b. Consequently, the pressure in the resonance chamber 2226 is increased to generate a pressure gradient.

Figure 9C:
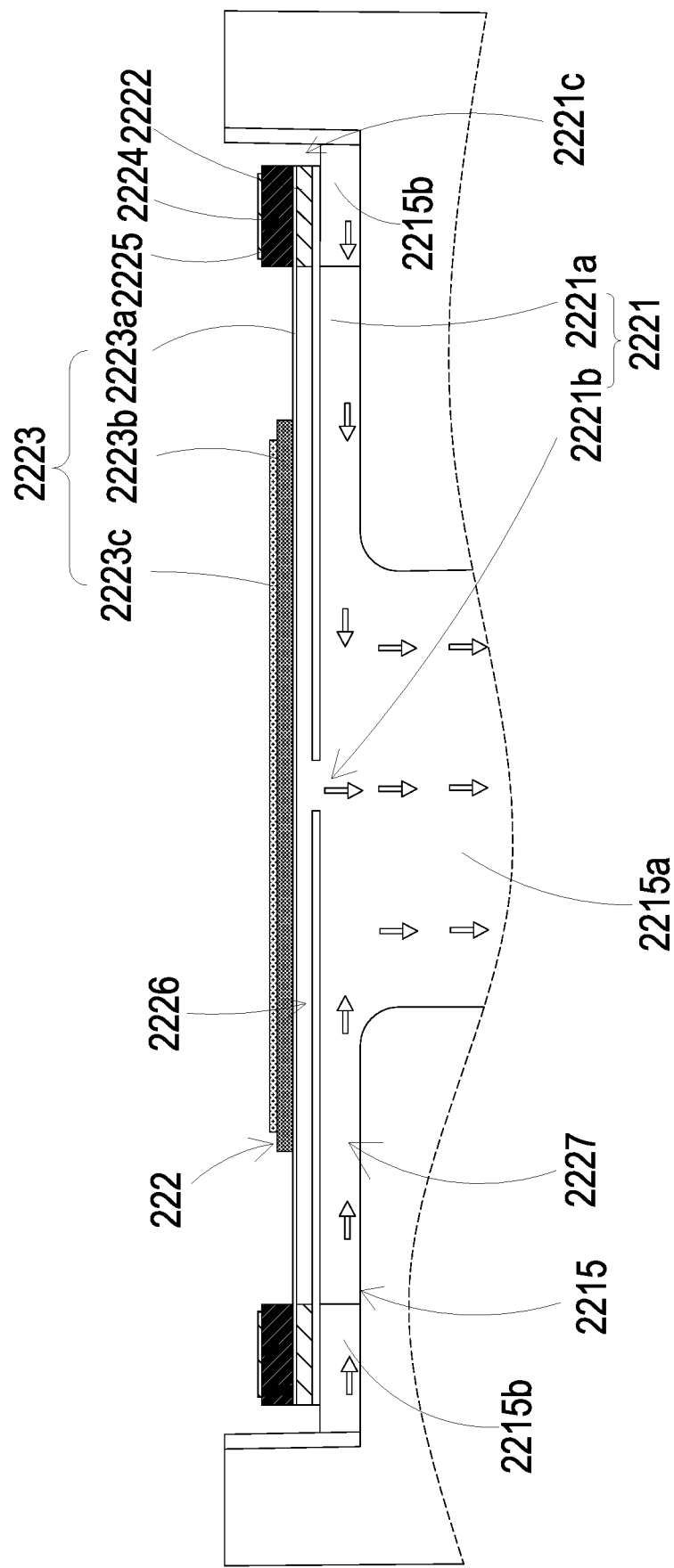
FIG. 9C is a schematic cross-sectional view illustrating a second operation step of the piezoelectric actuator according to the embodiment of the present disclosure.

Further as shown in FIG. 9C, when the suspension plate 2221a of the gas-injection plate 2221 is driven by the piezoelectric plate 2223c to move toward the bottom surface of the gas-guiding-component loading region 2215, the gas in the resonance chamber 2226 is discharged out rapidly through the hollow aperture 2221b, and the gas in the flowing chamber 2227 is compressed, thereby the converged gas is quickly and massively ejected out of the flowing chamber 2227 under the condition close to an ideal gas state of the Benulli's law, and transported to the ventilation hole 2215a of the gas-guiding-component loading region 2215.

By repeating the operation steps shown in FIG. 9B and FIG. 9C, the piezoelectric plate 2223c is driven to vibrate in a reciprocating manner. According to the principle of inertia, since the gas pressure inside the resonance chamber 2226 is lower than the equilibrium gas pressure after the converged gas is ejected out, the gas is introduced into the resonance chamber 2226 again. Moreover, the vibration frequency of the gas in the resonance chamber 2226 is controlled to be close to the vibration frequency of the piezoelectric plate 2223c, so as to generate the Helmholtz resonance effect to achieve the gas transportation at high speed and in large quantities.

Furthermore, as shown in FIG. 10A to FIG. 10C, the gas is inhaled through the inlet opening 2261a of the outer cover 226, flows into the gas-inlet groove 2214 of the base 221 through the gas-inlet 2214a, and is transported to the position of the sensor 225. Furthermore, the piezoelectric actuator 222 is enabled continuously to inhale the gas into the inlet path, and facilitate the external gas to be introduced rapidly, flowed stably, and be transported above the particulate sensor 225. At this time, a projecting light beam emitted from the laser component 224 passes through the transparent window 2214b and enters into the gas-inlet groove 2214 to irritate the suspended particles contained in the gas flowing above the particulate sensor 225 in the gas-inlet groove 2214. When the suspended particles contained in the gas are irradiated and generate scattered light spots, the scattered light spots are received and calculated by the particulate sensor 225 for obtaining related information about the sizes and the amount of the suspended particles contained in the air. The microprocessor 23 receives the detection signal of the suspended particles, and computes and processes the detection signal to generate the detection data of the air pollution source for providing to the communicator 24 for external wireless transmission. Moreover, the gas above the particulate sensor 225 is continuously driven and transported by the piezoelectric actuator 222, flows into the ventilation hole 2215a of the gas-guiding-component loading region 2215, and is transported to the gas-outlet groove 2216. Finally, after the gas flows into the gas-outlet groove 2216, the gas is continuously transported into the gas-outlet groove 2216 by the piezoelectric actuator 222, and the gas in the gas-outlet groove 2216 is pushed and discharged out through the gas-outlet 2216a and the outlet opening 2261b. Through such continuous air flow, the gas detection main body 22 of the gas detection device 2 can detect related information and generate the detection data of the suspended particles contained in the air pollution source passing therethrough. Moreover, the air guided into the gas detection main body 22 also passes through the gas sensor 227 in the gas-outlet grove 2216, so that the gas sensor 227 can detect the air pollution source and output detected information related to gaseous pollutants and microorganisms contained in the air pollution source.

As described above, by providing at least one gas detection device 2 disposed in at least one gas path A where the air pollution source has been filtered by the filter 1, the gas detection device 2 can detect the air pollution source and output detection data of the air pollution source. Furthermore, through at least one connection device 3 receiving, computing and comparing the detection data of the air pollution source detected by the gas detection device 2 via the wireless transmission, and a reducing rate of filtering efficiency for the filter 1 after filtering the air pollution source can be displayed. When the reducing rate of filtering efficiency for the filter 1 after filtering the air pollution source detected by the gas detection device 2 reaches a preset alert value, the connection device 3 sends out a notification alert of replacing the filter 1. In the embodiment, the connection device 3 is one selected from the group consisting of a mobile device and a display device. Moreover, the connection device 3 is preloaded with a program or an application for computing and comparing the received detection data, so as to display the detection data via a built-in display. Through creating a database of the alert values of the reducing rates of filtering efficiency for all kinds of pollutants contained in the air pollution source, and comparing with the alerts values stored in the database, the preloaded program or application in the connection device 3 can obtain the alert value of the reducing rate of filtering efficiency for the reviewed filter 1, thereby the connection device 3 can send out the notification alert for replacing the filter 1 accordingly.

The following description describes the process of generating the notification alert of replacing the filter for filtering PM2.5 suspended particles according to the present disclosure.

As shown in FIG. 11A, the chart of the reducing rate of filtering efficiency for an old filter after filtering PM2.5 suspended particles in accordance with the method of the present disclosure is illustrated. The gas detection device 2 detects the air pollution source and generates the detection data every 5 minutes, and the detection data is outputted to the connection device 3. After calculating by the connection device 3, the reducing rate of filtering efficiency is 1.6 $\mu g/m^3$-min. As indicated by the circle in FIG. 11A, a drop of the detection data in 5 minutes after filtering PM2.5 suspended particles is 12−4=8 $\mu g/m^3$-min, so the reducing rate of filtering efficiency per minute calculated and obtained by the connection device 3 is 1.6 $\mu g/m^3$-min.

As shown in FIG. 11B, the chart of the reducing rate of filtering efficiency for a new filter after filtering PM2.5 suspended particles in accordance with the method of the present disclosure is illustrated. The gas detection device 2 detects the air pollution source and generates the detection data every 5 minutes, and the detection data is outputted to the connection device 3. After calculating by the connection device 3, the reducing rate of filtering efficiency is 2 $\mu g/m^3$-min. As indicated by the circle in FIG. 11B, a drop of the detection data in 5 minutes after filtering PM2.5 suspended particles is 12−2=10 $\mu g/m^3$-min, so the reducing rate of filtering efficiency per minute calculated and obtained by the connection device 3 is 2 $\mu g/m^3$-min.

As described above, the program or application preloaded in the connection device 3 can create a database of the alert values of the reducing rates of filtering efficiency for all kinds of pollutants contained in the air pollution source, and accordingly, assumed that the alert value of the reducing rate of filtering efficiency for PM2.5 suspended particles is set as 2, the notification alert for replacing the old filter 1 in the embodiment of FIG. 11A will be generated and sent out by the connection device 3 as the reducing rate of filtering efficiency is lower than 2.

In summary, the present disclosure provides a method for notifying a service life of a filter includes steps of providing at least one filter for filtering an air pollution source; providing at least one gas detection device disposed in at least one gas path where the air pollution source has been filtered by the filter for detecting the air pollution source and outputting detection data of the air pollution source; providing at least one connection device for receiving, computing and comparing the detection data of the air pollution source detected by the gas detection device, so as to display a reducing rate of filtering efficiency for the filter after filtering the air pollution source; and determining if a notification alert for replacing the at least one filter should be issued accordingly.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for notifying a service life of a filter, comprising:
   providing at least one filter for filtering an air pollution source;
   providing at least one gas detection device disposed in at least one gas path where the air pollution source has been filtered by the filter, for detecting the air pollution source and outputting a detection data of the air pollution source;
   providing at least one connection device for receiving, computing and comparing the detection data of the air pollution source detected by the gas detection device, so as to display at least one reducing rate of filtering efficiency for the filter after filtering the air pollution source; and
   providing a notification alert for replacing the at least one filter when the reducing rate of filtering efficiency for the filter after filtering the air pollution source computed by the at least one connection device reaching a preset alert value,
   wherein the gas detection device comprises a control circuit board, a gas detection main body, a microprocessor and a communicator, and wherein the gas detection main body, the microprocessor and the communicator are integrally packaged on the control circuit board and electrically connected with the control circuit board, the microprocessor controls a detection operation of the gas detection main body, the gas detection main body detects the air pollution source and outputs a detection signal, and the microprocessor receives, computes and processes the detection signal to generate the detection data of the air pollution source for providing to the communicator for external wireless transmission,
   wherein the gas detection main body comprises:
   a base comprising:
      a first surface;
      a second surface opposite to the first surface;
      a laser loading region hollowed out from the first surface to the second surface;
      a gas-inlet groove concavely formed from the second surface and disposed adjacent to the laser loading region, wherein the gas-inlet groove comprises a gas-inlet and a transparent window opened on the lateral wall thereof and in communication with the laser loading region;
      a gas-guiding-component loading region concavely formed from the second surface and in communication with the gas-inlet groove, and having a ventilation hole penetrated a bottom surface thereof; and
      a gas-outlet groove concavely formed from a region of the first surface spatially corresponding to the bottom surface of the gas-guiding-component loading region and hollowed out from the first surface to the second surface in a region where the first surface is misaligned with the gas-guiding-component loading region, wherein the gas-outlet groove is in communication with the ventilation hole and comprises a gas-outlet mounted thereon;
   a piezoelectric actuator accommodated in the gas-guiding-component loading region;
   a driving circuit board covering and attaching to the second surface of the base;
   a laser component positioned and disposed on the driving circuit board and electrically connected to the driving circuit board, and accommodated in the laser loading region, wherein a light beam path emitted by the laser component passes through the transparent window and extends in an orthogonal direction perpendicular to the gas-inlet groove;
   a particulate sensor positioned and disposed on the driving circuit board and electrically connected to the driving circuit board, and accommodated in the gas-inlet groove at a region in an orthogonal direction perpendicular to the light beam path emitted by the laser component, for detecting particulates in the air pollution source passing through the gas-inlet groove and irradiated by a light beam emitted from the laser component; and
   a gas sensor positioned and disposed on the driving circuit board and electrically connected to the driving circuit board, and accommodated in the gas-outlet groove, for detecting the air pollution source guided into the gas-outlet groove; and
   an outer cover covering the base and comprising a lateral plate, wherein the lateral plate comprises an inlet opening and an outlet opening, and wherein the inlet opening is spatially corresponding to the gas-inlet of the base and the outlet opening is spatially corresponding to the gas-outlet of the base,
   wherein the first surface of the base is covered by the outer cover, and the second surface of the base is covered by the driving circuit board, so that an inlet path is defined by the gas-inlet groove and an outlet path is defined by the gas-outlet groove, thereby the piezoelectric actuator introduces the air pollution source in the air outside the gas-inlet of the base into the inlet path defined by the gas-inlet groove through the inlet opening, the particulate sensor detects a concentration of the particulates contained in the air pollution source, and the air pollution source enters the outlet path defined by the gas-outlet groove through the ventilation hole is detected by the gas sensor and discharged through the gas-outlet of the base and the outlet opening.

2. The method as claimed in claim 1, wherein the air pollution source comprises at least one selected from the group consisting of a gaseous pollutant, a particulate pollutant, a derivative pollutant, a toxic pollutant, a malodorous pollutant, a microorganism and a combination thereof.

3. The method as claimed in claim 2, wherein the gaseous pollutant comprises at least one selected from the group consisting of a sulfur oxide, a carbon monoxide, a nitrogen oxide, a hydrocarbon, a chlorine, a hydrogen chloride, a carbon disulfide, a hydrogen cyanide, a fluorinated gas, a halogenated hydrocarbon, a perhalogenated alkane and a combination thereof.

4. The method as claimed in claim 2, wherein the particulate pollutant comprises at least one selected from the group consisting of a total suspended particulate referring to particulates suspended in the air, a particulate matter referring to particles having diameters less than 10 μm, a dustfall referring to substances having diameters larger than 10 μm and gradually falling due to gravity, a metal fume and complex thereof referring to particulates containing metal and complex thereof, a smoke referring to black or dark grey smokes composed of carbon particles, an acid mist referring to microdroplets containing sulfuric acid, nitric acid, hydrochloric acid and phosphoric acid, a soot referring to blue and white smog containing hydrocarbons and a combination thereof.

5. The method as claimed in claim 2, wherein the particulate pollutant comprises at least one selected from the group consisting of a photochemical smog referring to particulates produced by photochemical reactions and suspended in the air to cause obstruction to visibility, a photochemical peroxide compound referring to substances with strong oxidizing properties produced by photochemical reactions and a combination thereof.

6. The method as claimed in claim 2, wherein the toxic pollutant comprises at least one selected from the group consisting of a fluoride, a chlorine, an ammonia, a hydrogen sulfide, a formaldehyde, a metal-containing gas, a sulfuric acid, a nitric acid, a phosphoric acid, a hydrochloric acid, a vinyl chloride monomer, a polychlorinated biphenyl, a hydrogen cyanide, a dioxin, a carcinogenic polycyclic aromatic hydrocarbon, a carcinogenic volatile organic compound, an asbestos, a substance containing asbestos and a combination thereof.

7. The method as claimed in claim 2, wherein the malodorous pollutant comprises at least one selected from the group consisting a methyl monosulfide, a monothiol, a monomethylamine and a combination thereof.

8. The method as claimed in claim 2, wherein the microorganism comprises at least one selected from the group consisting of bacteria, viruses and a combination thereof.

9. The method as claimed in claim 1, wherein the particulate sensor detects information of suspended particles.

10. The method as claimed in claim 1, wherein the gas sensor detects information of gaseous pollutants and information of microorganisms.

11. The method as claimed in claim 1, wherein the connection device receives, computes and compares the detection data of the air pollution source detected by the gas detection device via a wireless transmission, and the connection device is selected from the group consisting of a mobile device and a display device, and wherein the wireless transmission is performed by at least one selected from the group consisting of a Wi-Fi module, a Bluetooth module, a radio frequency identification module, and a near field communication module.

12. The method as claimed in claim 1, wherein the filter is made from at least one selected from the group consisting of a glass fiber, an artificial fiber, a carbon fiber, a vegetable fiber, a wool fiber, an asbestos fiber, a nanofiber, an activated carbon, a nonwoven fabric and a combination thereof.

13. The method as claimed in claim 12, wherein the filter is coated with an additive for effectively enhancing a filtration efficiency of the filter.

14. The method as claimed in claim 13, wherein the additive is a layer of cleansing factor containing chlorine dioxide for inhibiting viruses and bacteria in the air pollution source.

15. The method as claimed in claim 13, wherein the additive is an herbal protective layer extracted from ginkgo and Japanese *rhus Chinensis* to form an herbal protective anti-allergic filter, so as to resist allergy effectively and destroy a surface protein of influenza virus passing through the filter.

16. The method as claimed in claim 13, wherein the additive is a silver ion for inhibiting viruses and bacteria contained in the air pollution source.

17. The method as claimed in claim 13, wherein the additive is a zeolite for effectively adsorbing volatile organic compounds in the air pollution source.

18. The method as claimed in claim 13, wherein the additive is a titanium dioxide for effectively forming a photocatalysis to remove the air pollution source.

* * * * *